June 10, 1952     J. G. LONG     2,599,767
RUBBER SEAL JOINT
Filed April 1, 1946
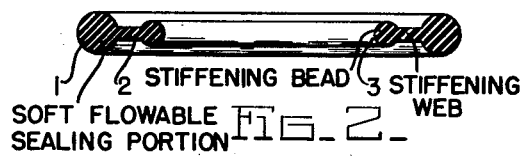
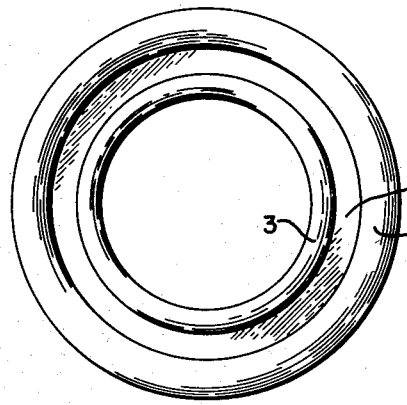
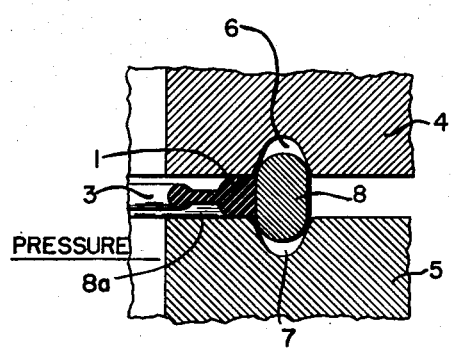
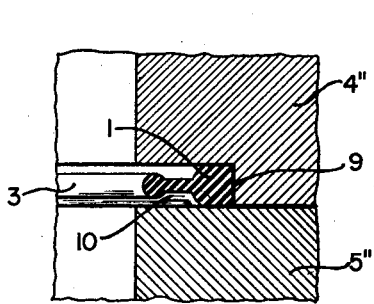
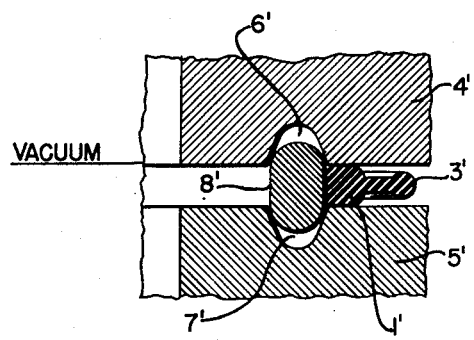
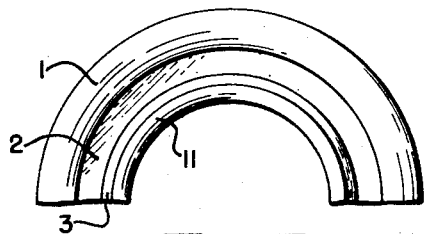
JOE G. LONG
INVENTOR.
BY *J. Vincent Martin*
*Ralph R. Browning*
*James B. Simms*
ATTORNEYS Patented June 10, 1952

2,599,767

UNITED STATES PATENT OFFICE 2,599,767

RUBBER SEAL JOINT

Joe G. Long, Houston, Tex.

Application April 1, 1946, Serial No. 658,739

3 Claims. (Cl. 285—1)

This invention relates in general to sealing members for preventing leaking and corrosion at joints in fluid tight systems and more particularly has reference to gaskets or sealing rings formed of resilient rubber reinforced by hard rubber or formed of other soft sealing material, reinforced with like material in a stiffer condition.

Gaskets and sealing rings employed heretofore were generally made of soft pliable material capable of sealing a joint. However, unless unusual care was taken in handling or installing the sealing member the more or less flimsy sealing ring was liable to be improperly located or overlapped resulting in a seal failure. Heretofore sealing members have been reinforced with steel or other metal elements imbedded within soft sealing material but these are not satisfactory in all installations. Moreover the bond, if any, between the soft sealing material and the metal reinforcing member often fails during the course of time destroying the effectiveness of the reinforcing material. When metallic seal members are used alone extreme care must be exercised to prevent scoring or corrosion of the member and the metallic parts of the joint.

An object of this invention is to provide a sealing member which lacks the disadvantages of the prior art.

Another object of this invention is to provide a reinforced sealing member in which both the sealing portion and the reinforcing portion are formed of substantially the same material.

A further object is to provide a sealing member of resilient packing material having reinforcing material integrally formed therewith.

Other objects will become apparent from the following description of the several forms of construction of the invention.

In order to facilitate an understanding of the invention reference is made to the accompanying drawing in which:

Figure 1 is a plan view of a sealing ring constructed in accordance with the present invention, Fig. 2 is an axial sectional view of the sealing ring of Fig. 1, Fig. 3 is a fragmentary sectional view of a sealing ring such as shown in Figs. 1 and 2 in sealing position in an installation, Fig. 4 is a view similar to Fig. 3 showing the sealing ring in a different installation, Fig. 5 is another view similar to that of Fig. 3 illustrating the sealing ring in place in still another type of installation, Fig. 6 is a fragmentary plan view of the sealing ring of Fig. 1 shown in conjunction with an auxiliary stiffener or flow preventer, and Fig. 7 is a sectional fragmentary view of the assembly of Fig. 6.

As shown in the drawing, a sealing member according to the present invention comprises a soft pliable member 1 which may be in the form of a ring and a stiffener or reinforcing member 2. The stiffener comprises a flat portion extending from one side of the sealing member and terminating in a bead 3. It will be noted that sealing member 1 is of a thickness much greater than that of the flat portion of the stiffener 2 and greater than that of the bead 3.

In accordance with the present invention the sealing member and the stiffener are both formed of like material and made integral with each other. For instance the sealing member 1 may be formed of soft pliable rubber, either natural or synthetic, and the stiffener may be formed of the same material in a hardened state, i. e. hard rubber. In place of natural or synthetic rubber various rubber substitutes or synthetics may be used.

A sealing member made according to the present invention serves very effectively in a joint such as shown in Fig. 3 of the drawing. This joint is formed between upper and lower elements 4 and 5 which may be the walls of a vessel or conduit. The meeting faces of the two elements are provided with registering grooves 6 and 7 for receiving a seal ring 8 which may be metallic. This ring 8 serves to register the upper and lower elements and provides an abutment for the sealing ring 1. In many installations the ring 8 is intended as the primary seal. However, in practice it has been shown that the ring 8 is subject to mechanical or corrosive damage and, therefore, some sealing member more readily capable of forming a seal under adverse conditions is desirable. Ring 1 serves this purpose well, positively sealing any scorings or other indentations or irregularities in seal member 8, or elements 4 or 5. When the walls 4 and 5 have a fluid pressure exerted on their inner surface as indicated in Fig. 3, the sealing member is constructed with the stiffener on the inside as illustrated in Figs. 1-3. On the other hand, when the inner surfaces of walls 4 and 5 are subjected to a pressure lower than that of the outer surface thereof, the sealing member, is constructed with the stiffener on the outer periphery thereof as shown in Fig. 5 of the drawing.

Instead of the joining faces of the elements 4 and 5 being grooved and fitted with a ring 8 or 8' they may be constructed with an integral shoulder 9 in either of the elements.

Grooves 6 and 7 are of such depth and ring 8 is of such thickness that when the elements are drawn together there will be ample compression of the sealing member to form a sealed joint. Likewise in the construction of Fig. 4 the recess 10 is of such depth that sealing member 1 will be adequately compressed when the parts 4" and 5" are drawn together.

In Figs. 6 and 7 an auxiliary stiffener 11 is illustrated. This stiffener is a grooved member adapted to receive and snugly fit the inner peripheral surface of bead 3 of the novel seal member of this invention. Stiffener 11 may be made of any suitable substantially rigid material and preferably is made of metal.

The stiffener 11 is primarily used in an installation such as shown in Figs 3 and 4, wherein the resilient seal member is exposed to a rapid flow of fluid. Where the fluid flow velocity is very high it sometimes occurs that the resilient seal member of the invention is pulled from its proper position in the installation. This is especially true where the seal member 8 effects a seal throughout a substantial part of its contact with elements 4 and 5 whereby the seal bead 1 is not subjected to a material pressure differential over a substantial area to hold it in place. In this type installation the auxiliary stiffener 11 reduces the likelihood of dislodgment of the seal member.

The stiffener being formed of material of substantially the same character as the sealing member 1 is integral therewith and will not separate therefrom after the sealing member has been in use. This insures a sealed joint which can be made and broken a number of times without destroying the effectiveness of the sealing member. The arrangement is such that the stiffened portion of the member supports the more pliable portion whereby the member as a whole may be more easily and accurately installed. The two portions of the sealing member being integrally formed together the life of the member is usually dependent only on the life of the more resilient or pliable sealing portion. The construction is such that an auxiliary stiffener may be provided.

Having described my invention, I claim:

1. In combination with an assembly having a recess with substantially parallel sides therein and a joint to be sealed adjacent the bottom of said recess, the improvement which comprises an integral sealing member having a sealing portion of soft flowable material and of a thickness when undistorted slightly greater than the width of said recess, said sealing portion being disposed adjacent the bottom of said recess in sealing engagement with the sides of the recess to be urged into sealing position with respect to said joint to be sealed by pressure of fluid applied through the open face of said recess, a stiffening rib of thickness less than the width of said recess and free from sealing engagement with the sides of the recess, said rib integral with said sealing portion and extending therefrom toward the open face of said recess, and an integral stiffening bead of greater thickness than said rib and of less thickness than said recess adjacent the opposite edge of said rib.

2. In combination with an assembly having a recess with substantially parallel sides therein and a joint to be sealed adjacent the bottom of said recess, the improvement which comprises a sealing member formed as a generally flattened annular strip having a sealing portion of thickest cross section and of soft flowable material along one edge, a stiffening bead adjacent the opposite edge of much thinner cross section than said sealing portion, said sealing portion when undistorted being slightly greater in thickness than said recess whereby two parallel surfaces of said recess may be in sealing engagement with opposite surfaces of said sealing portion to seal said joint while leaving said stiffening bead free from both said surfaces, and a stiffening web thinner than both said sealing portion and said bead and interconnecting said sealing portion and bead.

3. In combination with an assembly having spaced movable upper and lower elements with substantially parallel adjacent faces having registering annular grooves therein for receiving a seal ring forming a primary seal between said elements, the improvement which comprises a secondary seal for sealing irregularities in and adjacent said primary seal and consists of an integral generally flattened annular strip with a sealing portion of soft flowable material arranged with its outer periphery contacting said seal ring and of a thickness when undistorted slightly greater than the space between said parallel faces of said elements, said sealing portion being arranged to be urged by pressure to sealing position with respect to said primary seal ring and adjacent portions of said elements, a stiffening bead of less thickness than said recess, and a stiffening web integrally secured to the inner periphery of said sealing portion and connecting said bead with said sealing portion, said web being of less thickness than both said bead and said sealing portion.

JOE G. LONG.

REFERENCES CITED

The following references are of record in the file of this patent:

UNITED STATES PATENTS

| Number | Name | Date |
| --- | --- | --- |
| 368,189 | Carter | Aug. 16, 1887 |
| 761,325 | Schier et al. | May 31, 1904 |
| 1,692,857 | Oven | Nov. 27, 1928 |
| 2,081,040 | King | May 18, 1937 |
| 2,191,044 | Seligman | Feb. 20, 1940 |
| 2,397,486 | Hoertz | Apr. 2, 1946 |

FOREIGN PATENTS

| Number | Country | Date |
| --- | --- | --- |
| 16,457 | Switzerland | of 1898 |
| 537,654 | Great Britain | of 1941 |
| 596,311 | France | of 1925 |